United States Patent [19]  [11] 4,336,972
Dagiel  [45] Jun. 29, 1982

[54] UNITIZED BEARING ASSEMBLY

[75] Inventor: Richard T. Dagiel, Elk Grove Village, Ill.

[73] Assignee: Aetna Bearing Company, Chicago, Ill.

[21] Appl. No.: 134,743

[22] Filed: Mar. 27, 1980

[51] Int. Cl.³ .............................................. F16C 19/00
[52] U.S. Cl. ................................. 308/233; 308/189 R
[58] Field of Search .................... 308/189 R, 236, 230, 308/233, 235; 29/148.4 A

[56] References Cited

U.S. PATENT DOCUMENTS 4,120,543 10/1978 Greene et al. ................... 308/235 X

FOREIGN PATENT DOCUMENTS 399567 4/1909 France ................................ 308/190
275275 8/1927 United Kingdom ................ 308/233
723495 2/1955 United Kingdom ................ 308/235
1266327 3/1972 United Kingdom ................ 308/191

Primary Examiner—Harry N. Haroian
Attorney, Agent, or Firm—Trexler, Bushnell & Wolters, Ltd.

[57] ABSTRACT

A bearing assembly is made up of an annular, ball-bearing retainer or cage and a pair of metal races which are held in operative position by an assembly member. The assembly member includes an annular shoulder which confronts one of the races in load-bearing relationship and a cylindrical sleeve which extends through the races and the carrier, the free end of the sleeve being fashioned with resilient fingers for promoting snap-fit assembly.

2 Claims, 3 Drawing Figures

U.S. Patent  Jun. 29, 1982  4,336,972
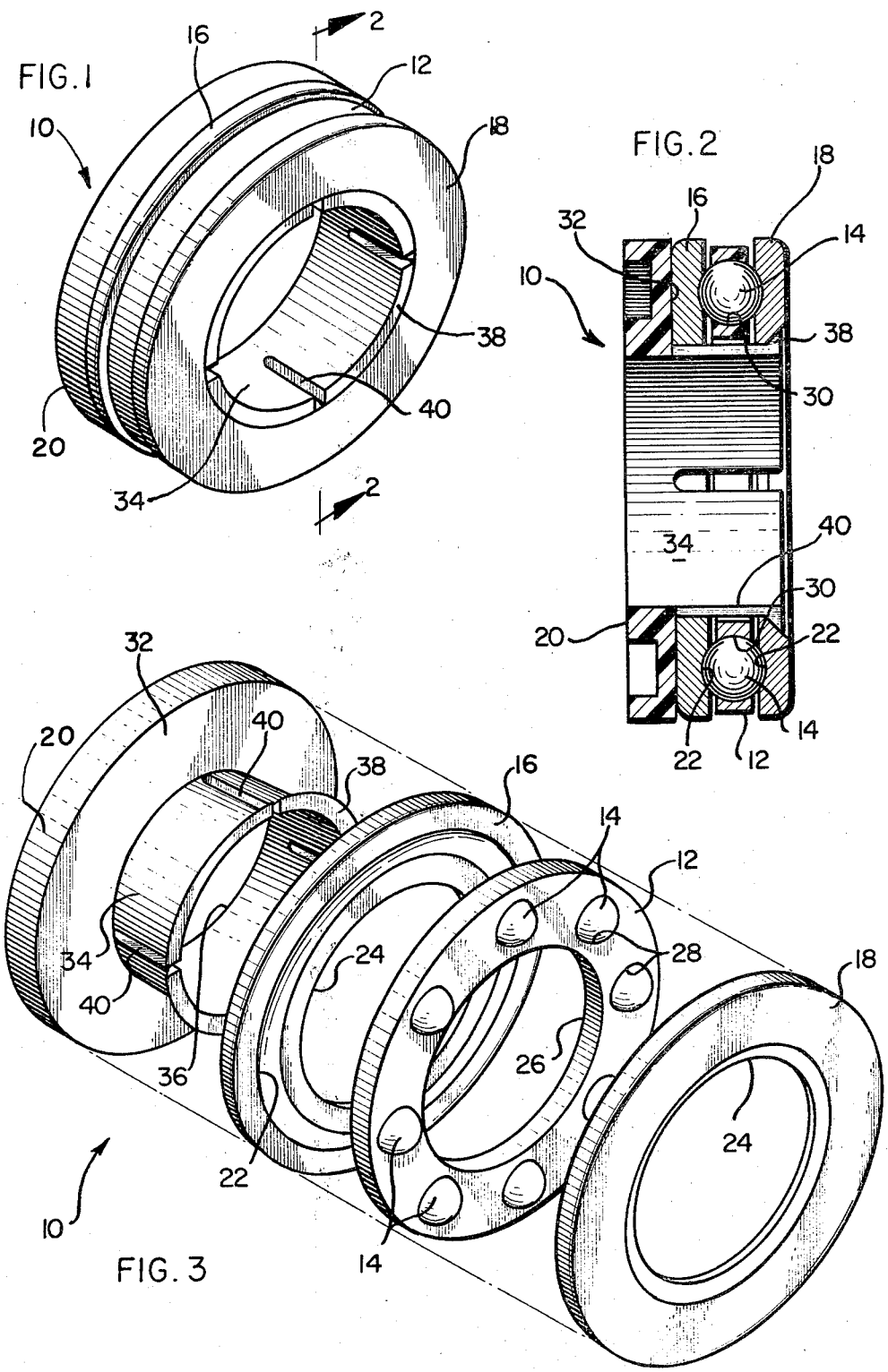

UNITIZED BEARING ASSEMBLY

BACKGROUND OF THE INVENTION

This invention relates generally to ball-bearing assemblies, and more particularly to low-cost ball-bearing structures.

Many industrial and commercial products employ ball-bearings, and there are numerous engineering applications where an inexpensive bearing unit or assembly of this general type is required. In the past, attempts have been made to construct a low-cost ball-bearing unit utilizing an outer, sheet metal shell or band to retain the balls and the respective races in operatively assembled condition. However, in practice, this arrangement has not proved to be of the desired economy. Production handling of the individual bearing balls and races and forming of the outer band into proper configuration for permanently and accurately positioning the components have, to a substantial degree, counteracted the fundamental cost advantages of this prior art design.

SUMMARY OF THE INVENTION

It is therefore an important object of the present invention to provide a ball-bearing unit which is easy and economical both to fabricate and to assemble.

A more general object of the invention is to provide a new and improved bearing assembly.

Another object of the invention is to provide a ball-bearing unit which is readily assembled by a snap-fit connection of its components.

Still another object of the invention is to provide a ball-bearing unit which exhibits a floating relationship of the races and the bearing balls and thus does not require close dimensional tolerances.

These and other objects and features of the present invention will become more apparent from a consideration of the following descriptions.

BRIEF DESCRIPTION OF THE DRAWING

In order that the principles of the invention may be readily understood, a single embodiment thereof, but to which the application is not to be restricted, is shown in the accompanying drawing, wherein:

FIG. 1 is a perspective view of a unitized bearing assembly constructed according to the invention;

FIG. 2 is an enlarged sectional view taken substantially along the line 2—2 of FIG. 1; and FIG. 3 is an exploded perspective view of the bearing assembly of FIGS. 1 and 2.

DESCRIPTION OF DISCLOSED EMBODIMENT

Referring now in detail to the drawing, specifically to FIGS. 1 and 3, a bearing assembly which is indicated generally by the reference numeral 10 is seen to comprise an annular retainer 12, a plurality of suitably hardened steel balls 14, a pair of axially spaced races 16 and 18 and an assembly member 20. The retainer 12 is adapted to serve as a carrier or cage for the ball-bearings 14, arcuately positioning the ball bearings in freely rotatable relationship, as will be described more fully hereinafter. The respective races 16 and 18 sandwich the retainer 12 and engage the ball bearings 14 in rolling relationship. Desirably, the races 16 and 18 are fabricated from a suitable sintered bearing metal and are fashioned with respective semi-toroidal grooves or tracks for fitably and rollably engaging the surfaces of the ball bearings 14 which extend beyond the faces of retainer 12, as is best seen in FIG. 2. The races 16 and 18 are provided with central circular apertures 24 and the retainer 12 is arranged with a central circular aperture 26 for purposes of cooperating to define a common bore.

Continuing with particular reference to FIG. 3, the retainer 12 includes an arcuate pattern of generally circular cavities 28 for receiving the ball bearings 14; and turning to FIG. 2, each of the cavities 28 is fashioned with an annular groove 30 for receiving and retaining a ball bearing 14 in snap-fit assembly. Desirably, the retainer 12 is fabricated from a suitable engineering plastic such as the polymeric amide resin sold under the tradename "Nylon" or the oxymethylene polymer sold under the trademark "Delrin". Such materials exhibit excellent strength and bearing properties as well as sufficient resiliency to promote the snap-fit assembly with the bearing balls 14.

The present invention is principally directed to the arrangement of the assembly member 20 for use in coupling the retainer 12, the ball bearings 14 and the races 16 and 18 in operative condition. More specifically, and with particular reference to FIG. 3, the assembly member 20 includes an annular shoulder 32 and a cylindrical sleeve 34. The shoulder 32 confronts the outer face of race 16 in load-bearing relationship and is provided with a central aperture which is defined by a circular edge 36. The sleeve 34 extends axially from the edge 36 to define a shaft-receiving bore. The sleeve 34 is arranged to be pressed through the apertures 24 and 26 of races 16 and 18 and retainer 12 respectively; and the sleeve 34 terminates in a radially outwardly extending formation 38 at its free end. The formation 38 generally confronts the shoulder 32 to hold the retainer, the ball bearings and the races in the operative condition indicated in FIG. 2.

In order to facilitate snap-fit assembly of the races and retainer on the sleeve 34, the sleeve itself is made radially resilient adjacent the free-end formation 38; and advantageously, the sleeve 34 is fabricated with a suitable number of axially extending slots 40 to promote this resiliency. In addition, the entire assembly member 20 is fabricated of a suitabe antifriction material having plastic memory. Accordingly, the shoulder 32 may serve as an effective thrust bearing and the sleeve 34 acts to retain ball bearings 14 in the tracks 22 of the respective races in a loose fitting or floating relationship until such time as thrust loads are imposed whereupon the parts seek a more snug fit.

The drawing and the foregoing descriptions are not intended to represent the only form of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A unitized bearing assembly comprising: an annular retainer for arcuately positioning ball bearings in freely rotatable relationship and having a central aperture; a plurality of ball bearings assembled with said retainer; a pair of axially spaced race members, one said race member being disposed on each side of said retainer and engaging said ball bearings in rolling relationship, each said race member defining respective central apertures; and an assembly member including a radially extending, annular shoulder portion confronting one of said races in load-bearing relationship, a central aperture formed in said shoulder portion and defining a circular edge, and a cylindrical sleeve extending axially from said edge to define a shaft-receiving bore, said assembly member being fabricated from a resilient plastic material, and having one or more axially extending slots formed in said sleeve, said slots opening to the end of said sleeve remote from said shoulder portion, said end further including abutment means thereon confronting said shoulder, with said race members and said retainer member being snapped fitted over said sleeve, with said sleeve being received in the central apertures of said retainer and said race members, said sleeve flexing resiliently to permit said snap-fit assembly, with said abutment means engaging the other of said race members, such that said shoulder portion and said abutment means serve to maintain said race members and said retainer member on said sleeve and assembled, yet freely moveable relationship to enhance the friction reducing properties of said bearing.

2. A bearing assembly according to claim 1 wherein said retainer includes an arcuate pattern of generally circular cavities for receiving said ball bearings, each of said cavities having an annular groove for receiving and retaining a ball bearing in snap-fit assembly.

* * * * *